(12) United States Patent
Cho

(10) Patent No.: US 11,710,250 B2
(45) Date of Patent: Jul. 25, 2023

(54) ELECTRONIC DEVICE, METHOD, AND STORAGE MEDIUM FOR SETTING PROCESSING PROCEDURE FOR CONTROLLING APPARATUS

(71) Applicant: CANON KABUSHIKI KAISHA, Tokyo (JP)

(72) Inventor: Genki Cho, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 16/989,651

(22) Filed: Aug. 10, 2020

(65) Prior Publication Data

US 2021/0065399 A1 Mar. 4, 2021

(30) Foreign Application Priority Data

Aug. 28, 2019 (JP) .................................. 2019-155980

(51) Int. Cl.
*G06T 7/73* (2017.01)
*G06T 7/00* (2017.01)

(52) U.S. Cl.
CPC .............. *G06T 7/73* (2017.01); *G06T 7/0004* (2013.01); *G06T 2207/30108* (2013.01)

(58) Field of Classification Search
CPC ......... G06T 2207/30108; G06T 7/0004; G06T 7/73; G05B 19/042
See application file for complete search history.

(56) References Cited

U.S. PATENT DOCUMENTS

| 10,882,189 | B2 * | 1/2021 | Matsuura | B25J 9/1671 |
| 2013/0114864 | A1 * | 5/2013 | Garcia | H04N 21/4788 |
| | | | | 382/118 |
| 2018/0338090 | A1 * | 11/2018 | Iida | G06T 7/73 |
| 2020/0167886 | A1 * | 5/2020 | Cho | B25J 9/1697 |
| 2020/0265233 | A1 * | 8/2020 | Jeong | G06T 7/60 |
| 2020/0401972 | A1 * | 12/2020 | Sakurai | G06Q 10/0633 |
| 2021/0162600 | A1 * | 6/2021 | Clever | B25J 9/1671 |
| 2021/0323150 | A1 * | 10/2021 | Cho | G06V 20/10 |
| 2022/0084304 | A1 * | 3/2022 | Li | G06T 7/11 |
| 2022/0138612 | A1 * | 5/2022 | Vengertsev | G05D 1/0238 |
| | | | | 706/12 |
| 2022/0319194 | A1 * | 10/2022 | Lin | B60W 30/06 |

FOREIGN PATENT DOCUMENTS

JP 2001-178686 A 7/2001

* cited by examiner

*Primary Examiner* — Bobbak Safaipour
(74) *Attorney, Agent, or Firm* — Canon U.S.A., Inc. IP Division

(57) ABSTRACT

An electronic device for setting a processing procedure for controlling an apparatus, the electronic device comprising: at least one processor configured to cause the electronic device to perform operations of: obtaining a captured image; determining a type of an object included in the captured image; notifying an item indicating target processing corresponding to the object included in the captured image, among a plurality of analysis processing; notifying a result obtained by applying the target processing to the captured image; and receiving a user instruction for adding the processing corresponding to the item to a processing procedure for controlling the apparatus.

15 Claims, 10 Drawing Sheets

FIG.7

| ID | TYPE | | CANDIDATE PROCESSING | | | | |
|----|------|---|---|---|---|---|---|
| 1 | BOX | | PRIORITY | 1 | 2 | 3 | 4 | ⋮ |
| | | | PROCESSING | POSITION | PHASE | FLAW | AREA | ⋮ |
| 2 | CIRCULAR RING | | PRIORITY | 1 | 2 | 3 | 4 | ⋮ |
| | | | PROCESSING | POSITION | OUTER DIAMETER | INNER DIAMETER | COUNT | ⋮ |
| 3 | 1D/2D CODE | | PRIORITY | 1 | 2 | 3 | 4 | ⋮ |
| | | | PROCESSING | DATA | POSITION | WIDTH | HEIGHT | ⋮ |
| 4 | CHARACTER | | PRIORITY | 1 | 2 | 3 | 4 | ⋮ |
| | | | PROCESSING | DATA | POSITION | WIDTH | DIRT | ⋮ |
| ⋮ | | | | | | | | |

ELECTRONIC DEVICE, METHOD, AND STORAGE MEDIUM FOR SETTING PROCESSING PROCEDURE FOR CONTROLLING APPARATUS

BACKGROUND

Field of the Disclosure

The present disclosure relates to an electronic device, a method, and a storage medium for setting a processing procedure for controlling an apparatus.

Description of the Related Art

There is a control apparatus that controls a robot such as a robot arm, an actuator, or a conveyance mechanism, based on an image obtained by capturing a workpiece.

Among control apparatuses of this type, there is an apparatus that enables a user to set a processing procedure (a flowchart) by combining a plurality of processing units (functional units) based on a purpose. The user sets the processing procedure beforehand, so that processing suitable for a purpose that the user desires to achieve can be automatically executed by the execution of the processing procedure by the control apparatus.

Japanese Patent Laid-Open No. 2001-178686 discusses displaying a result of applying each of a plurality of image processing units to an input image.

In a case where a processing unit to be used for generation of a processing procedure can be selected from many types of processing unit, it may be difficult for a user to select an appropriate processing unit.

SUMMARY

The present disclosure is directed to an electronic device, a method, and a storage medium for notifying a user of a processing unit to be used by the user to generate a processing procedure.

In order to solve the aforementioned issues, embodiments of the present disclosure provide an electronic device for setting a processing procedure for controlling an apparatus, the electronic device comprising: at least one processor configured to cause the electronic device to perform operations of: obtaining a captured image; determining a type of an object included in the captured image; notifying an item indicating target processing corresponding to the object included in the captured image, among a plurality of analysis processing; notifying a result obtained by applying the target processing to the captured image; and receiving a user instruction for adding the processing corresponding to the item to a processing procedure for controlling the apparatus.

Another aspect of the present disclosure provides a method for setting a processing procedure for controlling an apparatus, the method comprising: obtaining a captured image; determining a type of an object included in the captured image; notifying an item indicating target processing corresponding to the object included in the captured image, among a plurality of analysis processing; notifying a result obtained by applying the target processing to the captured image; and receiving a user instruction for adding the processing corresponding to the item to a processing procedure for controlling the apparatus.

Still another aspect of the present disclosure provides a non-transitory computer-readable storage medium storing a program for causing a computer to execute a method for setting a processing procedure for controlling an apparatus, the method comprising: obtaining a captured image; determining a type of an object included in the captured image; notifying an item indicating target processing corresponding to the object included in the captured image, among a plurality of analysis processing; notifying a result obtained by applying the target processing to the captured image; and receiving a user instruction for adding the processing corresponding to the item to a processing procedure for controlling the apparatus.

According to the present disclosure, a processing unit suitable for the type of an object included in a captured image is notified to a user. Therefore, a processing unit to be used by the user to generate a processing procedure that includes obtaining the captured image can be notified to the user.

Further features of the present disclosure will become apparent from the following description of exemplary embodiments with reference to the attached drawings.

BRIEF DESCRIPTION OF THE DRAWINGS

FIG. 7 is a diagram illustrating a table of a relationship between a type of workpiece and a recommended processing item.

DESCRIPTION OF THE EMBODIMENTS

Figure 1:
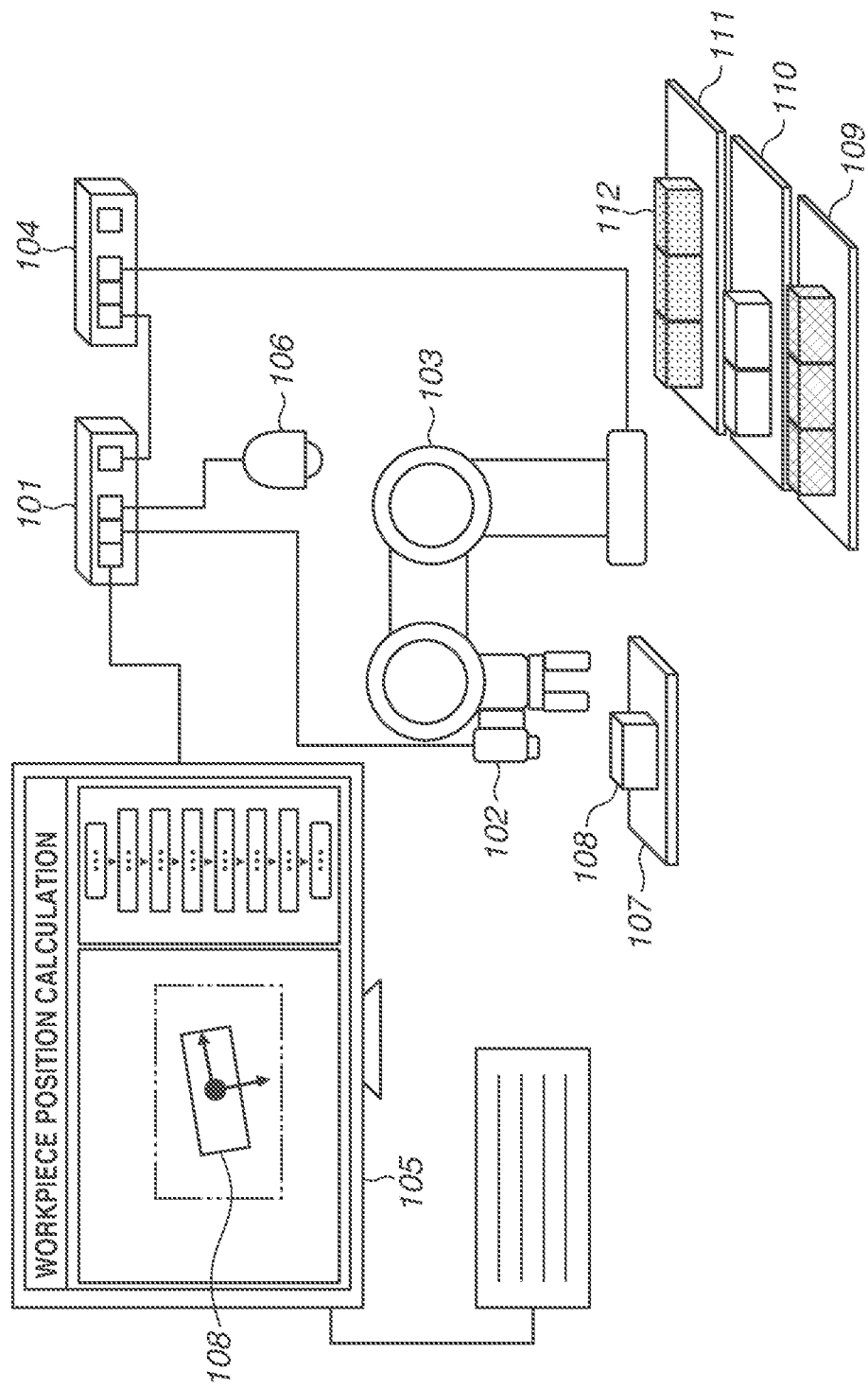
FIG. 1 is a diagram illustrating a configuration example of an entire system including an image processing apparatus according to an exemplary embodiment.

Hereinafter, embodiments will be described in detail with reference to the attached drawings. Note, the following embodiments are not intended to be limiting. Multiple features are described in the embodiments, but features of the embodiments may be combined as appropriate. Furthermore, in the attached drawings, the same reference numerals are given to the same or similar configurations, and redundant description thereof is omitted.

First Exemplary Embodiment

An embodiment according to the present disclosure will be described with reference to the drawings.

FIG. 1 is a diagram illustrating a configuration example of an entire system including an image processing apparatus 101. The system includes the image processing apparatus 101, a camera 102, a robot 103, a robot control apparatus 104, a client terminal 105, and a lighting apparatus 106. The system is used for placing a workpiece 108 disposed on the work base 107 on any of the placement bases 109 to 111 by using the robot 103. The use of the system is not limited thereto.

The image processing apparatus 101 controls the camera 102 and the robot 103. The image processing apparatus 101 controls the robot 103 via the robot control apparatus 104. The image processing apparatus 101 may directly control the robot 103 at predetermined timing, based on an internal program or a control instruction from an external control apparatus. The image processing apparatus 101 will be described as an apparatus in a housing different from the housing of each of the robot 103 and the robot control apparatus 104; however, the image processing apparatus 101 may be in the same housing as either thereof.

The image processing apparatus 101 sets capturing conditions (capturing parameters) of the camera 102, and issues a capturing instruction. The image processing apparatus 101 obtains a captured image from the camera 102, and applies image processing to the obtained image. The image processing apparatus 101 outputs the processed captured image to the client terminal 105 to display the image. The image processing apparatus 101 transmits a control instruction to the robot control apparatus 104.

The image processing apparatus 101 executes control processing for the camera 102, the robot 103, the robot control apparatus 104, the client terminal 105, and the lighting apparatus 106, and image processing for an obtained image, based on a predefined processing procedure. The processing procedure is set as a combination of a plurality of processing units that can be executed by the image processing apparatus 101. The image processing apparatus 101 is an electronic device that can create, edit, and update a program describing the processing procedure.

The camera 102 is a capturing apparatus that captures an image including an object (hereinafter, "workpiece"). The camera 102 has a mechanism for changing various capturing parameters including a zoom magnification, a focal distance, an aperture, and a signal amplification factor. These capturing parameters can be individually determined based on an instruction from the image processing apparatus 101.

The robot 103 is an industrial apparatus driven based on an instruction from the robot control apparatus 104. In the present embodiment, the robot 103 includes a grasping mechanism (e.g., a hand), and an arm mechanism (e.g., an arm) that moves the grasping mechanism. The robot 103 is a robot arm that grasps and moves a workpiece by controlling the hand and the arm. The camera 102 is attached to the arm of the robot 103. Thus, the position of the camera 102 can be controlled by moving the arm of the robot 103.

The robot control apparatus 104 receives control instructions from the image processing apparatus 101, and controls movement of each shaft and the hand of the robot 103.

The client terminal 105 includes a display, an input device, and a control device, and the client terminal 105 is connected to the image processing apparatus 101. The display is a display device such as a liquid crystal display. The input device is an input unit such as a keyboard, a mouse, an input operation controller, and a gesture input device. The input device is used for various operation inputs. For the input device, a touch panel disposed in the display may be used.

The client terminal 105 displays an image on the display based on an image input from the image processing apparatus 101. The user can input an instruction into the image processing apparatus 101 by operating the input device of the client terminal 105. The control device of the client terminal 105 connects to the image processing apparatus 101 to transmit and receive images and instructions. The display, the input device, and the control device of the client terminal 105 will be collectively referred to as the client terminal 105.

The lighting apparatus 106 is configured of, for example, a halogen lighting unit or a light-emitting diode lighting unit.

Figure 2:
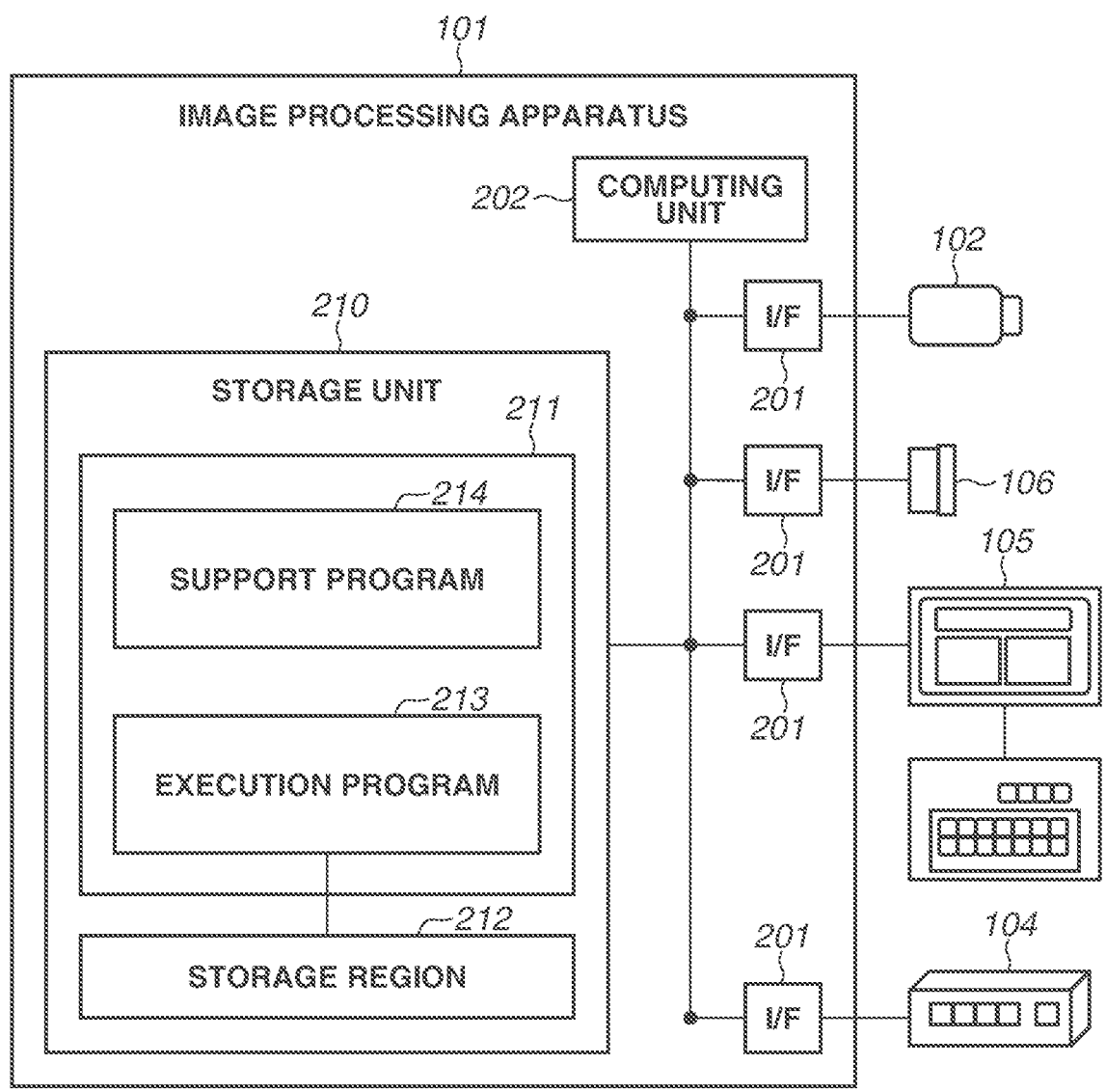
FIG. 2 is a block diagram illustrating an example of a detailed internal configuration of the image processing apparatus according to the exemplary embodiment.

FIG. 2 is a block diagram illustrating an example of a detailed internal configuration of the image processing apparatus 101. The image processing apparatus 101 includes interfaces (I/Fs) 201, a computing unit 202, and a storage unit 210.

The image processing apparatus 101 is connected to each of the camera 102, the robot control apparatus 104, the client terminal 105, and the lighting apparatus 106 via the interface 201 arranged on an internal bus. The interface 201 is configured based on a standard suitable for communicating with each of the above-described apparatuses. The interface standard can be selected from interfaces such as a network interface and a serial communication interface.

The computing unit 202 is a control unit that controls processing executed by the image processing apparatus 101. The computing unit 202 is configured of, for example, a central processing unit (CPU) as a general-purpose microprocessor, or an image processing processor.

The storage unit 210 is, for example, a read-only memory (ROM), a random access memory (RAM), or a nonvolatile memory device such as an erasable programmable ROM (EPROM) or an electrically erasable programmable ROM (EEPROM). The image processing apparatus 101 may be connected to an external storage device for expanding a data storage region. The storage unit 210 can be configured of a region such as a file region or a virtual storage region on the external storage device connected to the image processing apparatus 101.

The storage unit 210 includes a program storage region 211 for storing programs executed by the computing unit 202 and a storage region 212 for storing processing data. The program storage region 211 stores an execution program 213 and a support program 214. The execution program 213 is used for executing a processing procedure. The support program 214 is used for supporting a user to set the processing procedure described in the execution program 213. The storage region 212 is configured of a RAM region of the storage unit 210, or a region such as a file region or a virtual storage region of an external storage device. The storage region 212 is used to temporarily store processing data, and to store data such as setting parameters for image processing.

As an example of the execution program 213 stored in the program storage region 211, a processing procedure is set; the processing procedure is performed by the robot 103 to place the workpiece 108 disposed on the work base 107 on any of the placement bases 109 to 111. Specifically, the image processing apparatus 101 controls the position and the posture of the robot 103 such that the camera 102 is located at a position (a capturing position Pa) where a region including the workpiece 108 can be captured from above the work base 107. After moving the camera 102 to the capturing position Pa, the image processing apparatus 101 controls the camera 102 such that the camera 102 captures the region including the workpiece 108. The image processing apparatus 101 obtains a captured image from the camera 102, performs image processing (analysis processing) on the captured image, and obtains parameters indicating the position and the posture of the workpiece 108. The image processing apparatus 101 controls the robot 103 to correct the grasping position of the workpiece 108, based on the parameters indicating the position and the posture obtained through the analysis processing. The image processing apparatus 101 controls the movement of the robot 103 such that the arm of the robot 103 grasps the workpiece 108, based on the parameters indicating the position and the posture of the workpiece 108. The image processing apparatus 101 further aligns and places the grasped workpiece 108 on any of the placement bases 109 to 111. FIG. 1 illustrates an example in which a workpiece 112 is placed, and a predetermined number of workpieces are aligned and placed on each of the placement bases 109 to 111. After or during the processing performed by the image processing apparatus 101, information such as the progress of processing, a result, and a response may be appropriately displayed on the display device.

Figure 3:
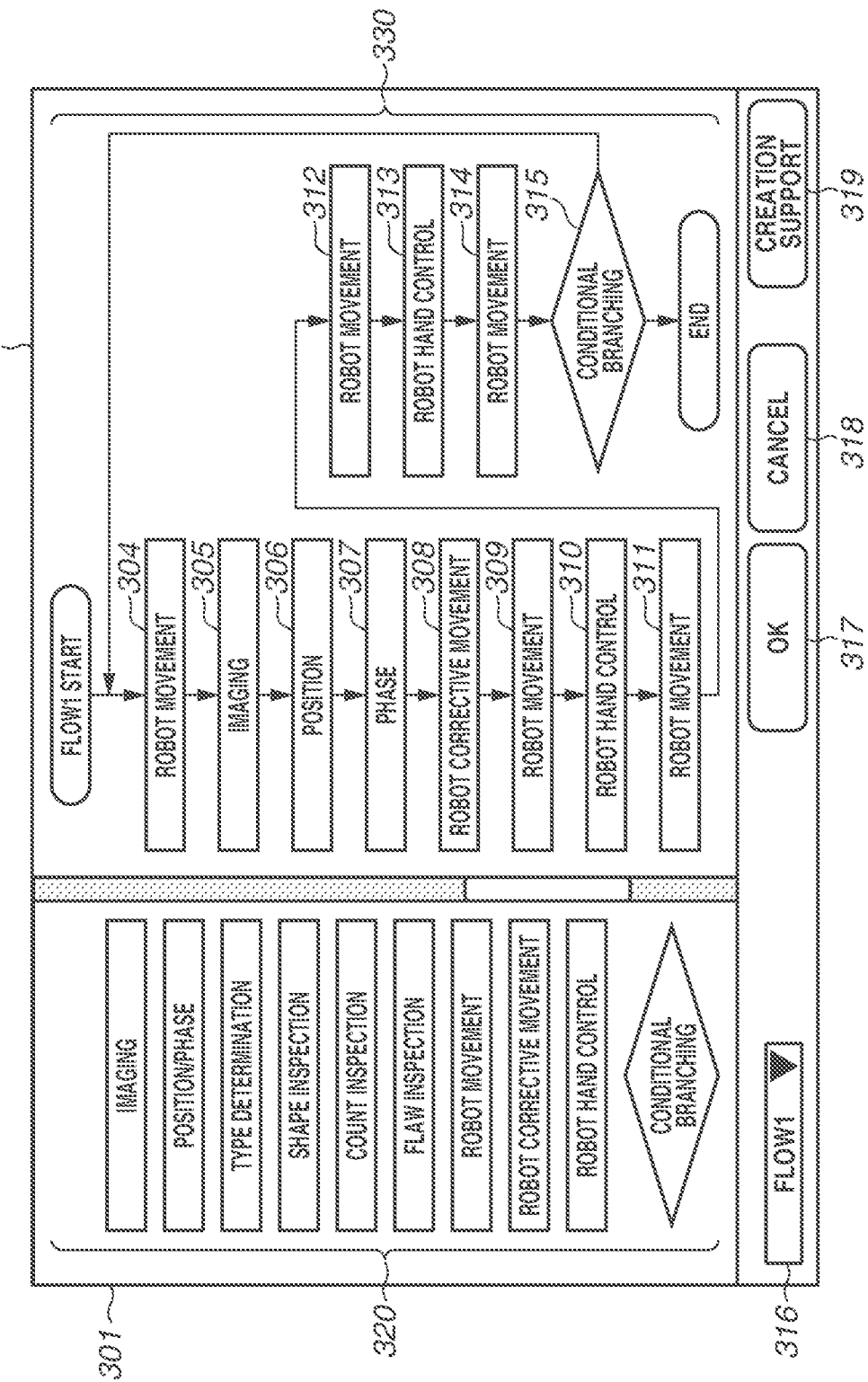
FIG. 3 is a diagram illustrating an example of a flowchart creation screen for executing an execution program.

When the computing unit 202 executes the support program 214, the computing unit 202 displays a screen indicating the processing procedure of the execution program 213 in a form of a flowchart on the display of the client terminal 105. The computing unit 202 displays an editing screen for updating the processing procedure of the execution program 213 on the display of the client terminal 105. FIG. 3 is a schematic diagram illustrating the flowchart representing the processing procedure of the execution program 213 and the editing screen. In another exemplary embodiment, the execution program 213 may be stored in the storage unit 210 of the image processing apparatus 101 after the execution program 213 is updated by another electronic device.

The screen (the editing screen) displayed on the display of the client terminal 105 includes an editing region 301 and a flowchart region 302. The editing region 301 includes a list 320 for selecting a plurality of processing parts for editing a flowchart, and a list box 316 for selecting the execution program 213 as a target for creation or editing.

The editing region 301 includes a button (an OK button) 317 and a button (a cancel button) 318. The button 317 is used for completing creation or editing of the execution program 213 and storing the created or edited execution program 213 in a saving area. The button 318 is used for canceling creation or editing of the execution program 213.

The editing region 301 includes a button (a creation support button) 319 for activating a function of supporting creation of a flowchart. The flowchart region 302 is a region for indicating the flowchart that represents the processing procedure of the execution program 213. The user can set the processing procedure of the execution program 213, by editing the flowchart displayed in the flowchart region 302 by operating the client terminal 105.

The list 320 is a list that indicates processing parts (processing units) for creating the flowchart representing the processing procedure of the execution program 213. The user uses the input device of the client terminal 105 to drag the processing parts from the list 320, drops the dragged parts into the flowchart region 302, and connects the dropped parts with lines, and thereby creating the flowchart.

The list box 316 is used for selecting a flowchart to be displayed on the screen. By operating the input device of the client terminal 105 to make a selection in the list box 316, the user can switch from one flowchart to another to be displayed, or input a new flowchart name into the list box 316. In the example illustrated in FIG. 3, a processing procedure in a case where a type of workpiece is box is illustrated. In a case where the type of workpiece is other type, some of the processing parts are different. Thus, when creating a flowchart for handling a workpiece of other type, it may be desirable to switch to a flowchart to be displayed, by operating the list box 316.

The button 317 is a button for providing an instruction for storing the created flowchart and updating the execution program 213. The cancel button 318 is a button for discarding the settings up to a time the button is pushed. The creation support button 319 is a button for activating the function of supporting creation of a flowchart. Processing in a case where the creation support button 319 is selected will be described in detail below.

A flowchart 330 displayed in the flowchart region 302 describes the processing procedure of the series of controls described above. Next, each of the processing parts illustrated in FIG. 3 will be described.

A processing part 304 is a movement part that represents processing (movement processing) for moving the arm mechanism of the robot 103. When the computing unit 202 executes processing of the processing part 304, the arm mechanism of the robot 103 moves the camera 102 to a point above the work base 107 so that the camera 102 attached to the arm mechanism of the robot 103 moves to the position where the workpiece 108 on the work base 107 can be captured.

A processing part 305 is a capturing part that represents processing (capturing processing) for executing capturing operation with the camera 102. When the computing unit 202 executes the processing of the processing part 305, a control command for executing the capturing processing with the camera 102 is output.

A processing part 306 is a position measurement part that represents position measurement processing for measuring the position of the workpiece 108. A processing part 307 is a phase measurement part that represents phase measurement processing for measuring a phase of the workpiece 108. As will be described more in detail below, each of these processing parts is a part for measuring the workpiece 108 using characteristic information such as luminance gradient, shade information, and color information of image information.

A processing part 308 is a corrective movement part that represents corrective movement processing for relatively moving the position and the posture of the hand of the robot 103. When the computing unit 202 executes the processing of the processing part 308, the computing unit 202 performs corrective movement such as rotation of the hand (an end effect) of the robot 103, by correctively controlling the robot 103 based on the position and the phase of the workpiece measured by the processing parts 306 and 307.

A processing part 309 is a movement part that represents processing (movement processing) for moving the arm mechanism of the robot 103. When the computing unit 202 executes the processing of the processing part 309, the arm of the robot 103 is controlled such that the hand of the robot 103 is located at a position where the workpiece 108 can be grasped (picked), e.g., a position immediately above the workpiece 108.

A processing part 310 is a hand control part that represents hand control processing for controlling opening/closing of the hand of the robot 103 and an adsorption amount of an adsorption device. When the computing unit 202 executes the processing of the processing part 310, opening/closing of the hand of the robot 103 is controlled to grasp the workpiece 108.

A processing part 311 is a movement part that represents processing (movement processing) for moving the arm mechanism of the robot 103. When the computing unit 202 executes the processing of the processing part 311, the movement of the arm is controlled to move the hand of the robot 103 to a point above the placement base suitable for the type of workpiece.

A processing part 312 is a movement part that represents processing (movement processing) for moving the arm mechanism of the robot 103. When the computing unit 202 executes the processing of the processing part 312, the movement of the arm is controlled to move the hand of the robot 103 to a point above a position where the workpiece 108 is to be placed.

A processing part 313 is a hand control part that represents hand control processing for controlling the opening/closing of the hand of the robot 103 and the adsorption amount of the adsorption device. When the computing unit 202 executes the processing of the processing part 313, the opening/closing of the hand and the adsorption amount are controlled, so that the workpiece 108 is placed.

A processing part 314 is a movement part that represents processing (movement processing) for moving the arm mechanism of the robot 103. When the computing unit 202 executes the processing of the processing part 314, the arm of the robot 103 is moved to a point above the placement base.

A processing part 315 is a branching part that represents determination processing for determining conditional branching. When the computing unit 202 executes the processing of the processing part 315, the computing unit 202 determines whether the number of times the series of processing of the processing parts 304 to 314 has been executed (the number of execution times) is more than or equal to a threshold value. In a case where the number of execution times is less than the threshold value, the computing unit 202 returns the processing to the processing part 304. In a case where the number of execution times is more than or equal to the threshold value, the computing unit 202 terminates the processing (termination processing).

In response to a specific operation performed by the user, such as a double click performed on any of the processing parts of the flowchart 330 displayed in the flowchart region 302 by operating the client terminal 105, transition to a setting screen for this processing part occurs. For example, in the case of the movement part, parameters such as a target position (coordinates), a moving speed, and a movement path for moving the arm can be set in the setting screen.

Next, an issue in a case where the user creates the flowchart illustrated in FIG. 3 and a solution thereto according to the present embodiment will be described.

Figure 4:
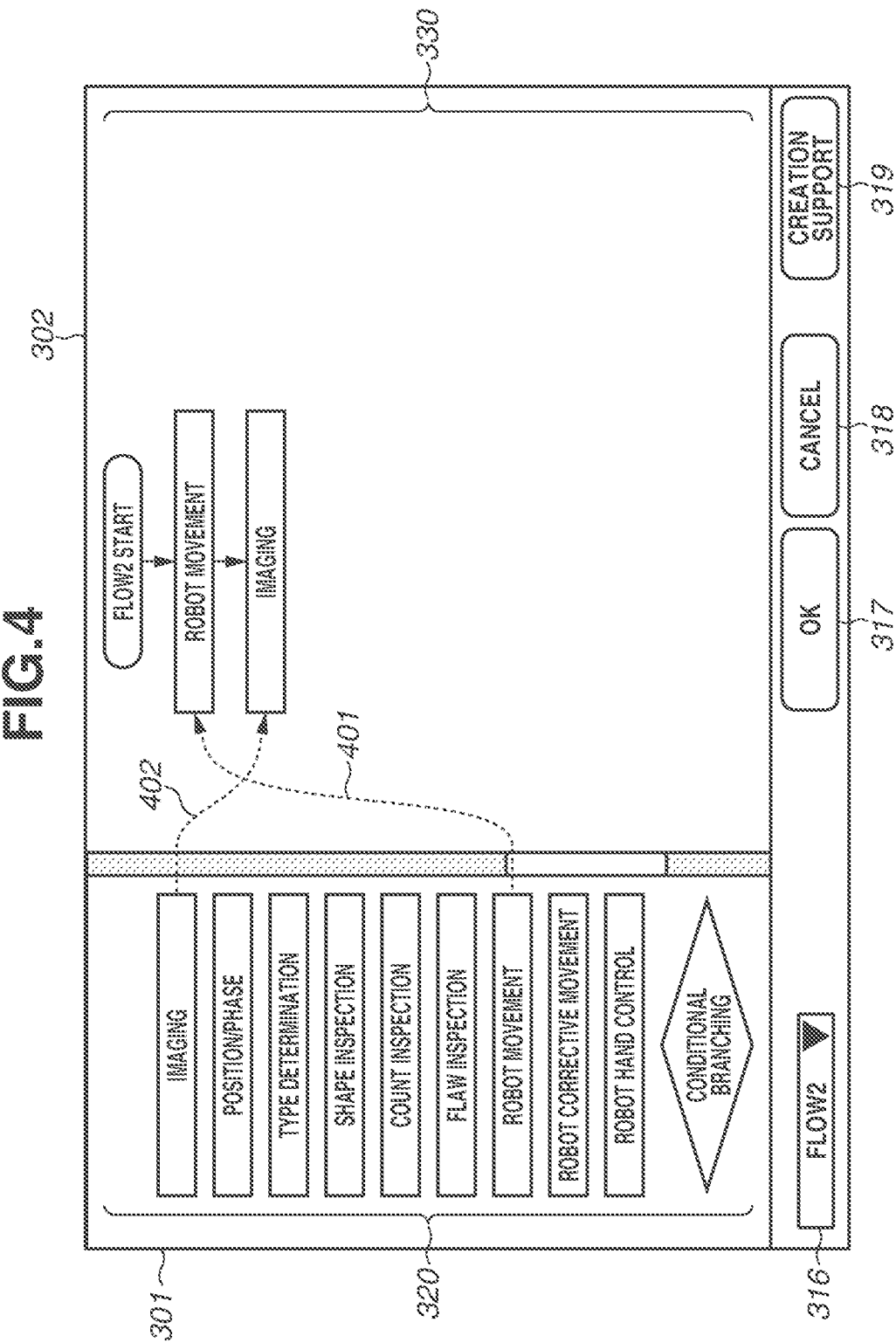
FIG. 4 is a diagram illustrating a flowchart creation procedure.

FIG. 4 is a diagram illustrating a flowchart creation procedure. FIG. 4 illustrates an editing screen. The editing region 301, the flowchart region 302, and the processing parts and buttons included in these regions correspond to those illustrated in FIG. 3, and thus description will be omitted.

The user starts work to create a flowchart representing a processing procedure for placing the workpiece 108 disposed on the work base 107 on any of the placement bases 109 to 111 using the robot 103.

The user first creates a flow for obtaining a captured image to recognize the workpiece 108 located on the work base 107.

The user first selects (drags) a movement part from the list 320, and moves (drops) the selected movement part to the flowchart region 302 in an illustrated direction of an arrow 401, by operating the input device of the client terminal 105. Even for the arm that moves the camera 102 to the capturing position, coordinate information indicating a target position is stored in advance in the storage region 212 of the storage unit 210, as a default of the target position of the movement part. Thus, the user can move the robot 103 to a point above the work base 107 only by selecting the movement part.

The user selects an capturing part and moves the selected capturing part to the flowchart region 302 in a direction indicated by an arrow 402, by operating the input device of the client terminal 105. The movement part and the capturing part are connected by a straight line that indicates consecutive processing. The following information is also stored in advance in the storage region 212 of the storage unit 210: capturing parameters (e.g., exposure, and a zoom magnification) used in a case where the capturing part is executed, and determination methods (e.g., fixed value use, automatic exposure, and automatic focusing) for the capturing parameters. Thus, the user can perform capturing using the capturing parameters, only by selecting the capturing part.

The computing unit 202 executes the processing of each of the processing part 304 and the processing part 305, so that the arm of the robot 103 moves, and the camera 102 attached to the arm moves to a predetermined capturing position. Subsequently, the camera 102 performs capturing.

Next, the user creates processing for grasping the workpiece 108 based on a captured image, as a flowchart. In this process, if the user does not have detailed knowledge about image processing technique, there may be a case that the user cannot determine which part is a suitable selection among the processing parts included in the list 320.

In the present embodiment, creation support processing for notifying a processing part (a processing unit) to be placed in a subsequent stage to the user based on a captured image is performed, so that the user is assisted in selecting a processing part related to image processing.

Figure 5:
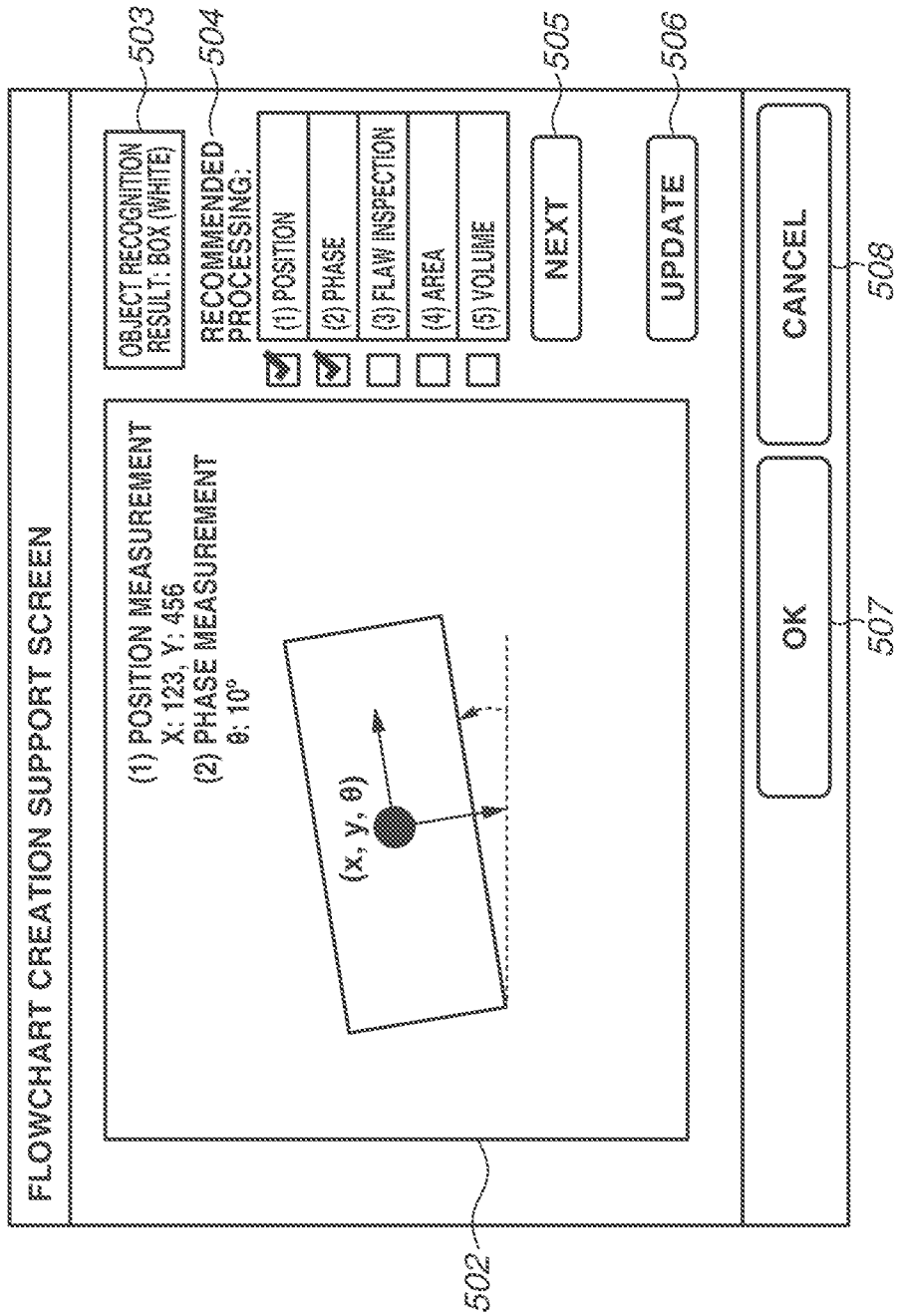
FIG. 5 is a diagram illustrating an example of a flowchart creation support screen.

FIG. 5 is a schematic diagram illustrating a support screen 501 to which transition occurs at the selection of the creation support button 319 in FIG. 4. The support screen 501 in FIG. 5 may be displayed immediately after the flowchart creation screen in FIG. 3 is displayed.

The support screen 501 includes a display region 502, a display region 503, and a processing item region 504. The display region 502 indicates a captured image and a result of image processing described below. The display region 503 indicates a result of analyzing the type of a workpiece included in a captured image. The processing item region 504 indicates one or more candidates for a processing unit corresponding to the type of workpiece obtained by the analysis. The support screen 501 includes buttons 505 to 508 for controlling the creation support processing.

The button 505 is a button for further displaying a processing item not being displayed in the processing item region 504. In a case where a suitable processing item is not present among the recommended items currently displayed in the processing item region 504, or a case where a comparison with other processing item is to be made, different recommended processing items can be displayed by selecting the button 505.

The button 506 is a button for performing (updating) again, for example, input of a captured image, object recognition, and presentation of recommended processing. The button 506 is used in cases such as a case where switching to a clearer captured image of the same workpiece is performed, and a case where changing to a captured image of a different workpiece of the same type occurs. There may be adopted a mode such as a live view mode in which a captured image is input in real time and the captured image is periodically updated.

The button 507 is a button for determining a processing item to be adopted as a part. When the button 507 is selected, a selection result in the processing item region 504 is stored into the storage region 212 of the image processing apparatus 101, in association with the execution program 213. In a case where the button 508 is selected, the processing result in the screen illustrated in FIG. 5 is discarded and this screen returns to the screen illustrated in FIG. 4.

Next, flowchart-creation support processing that the computing unit 202 starts executing in response to transition to the support screen 501 will be described.

Figure 6:
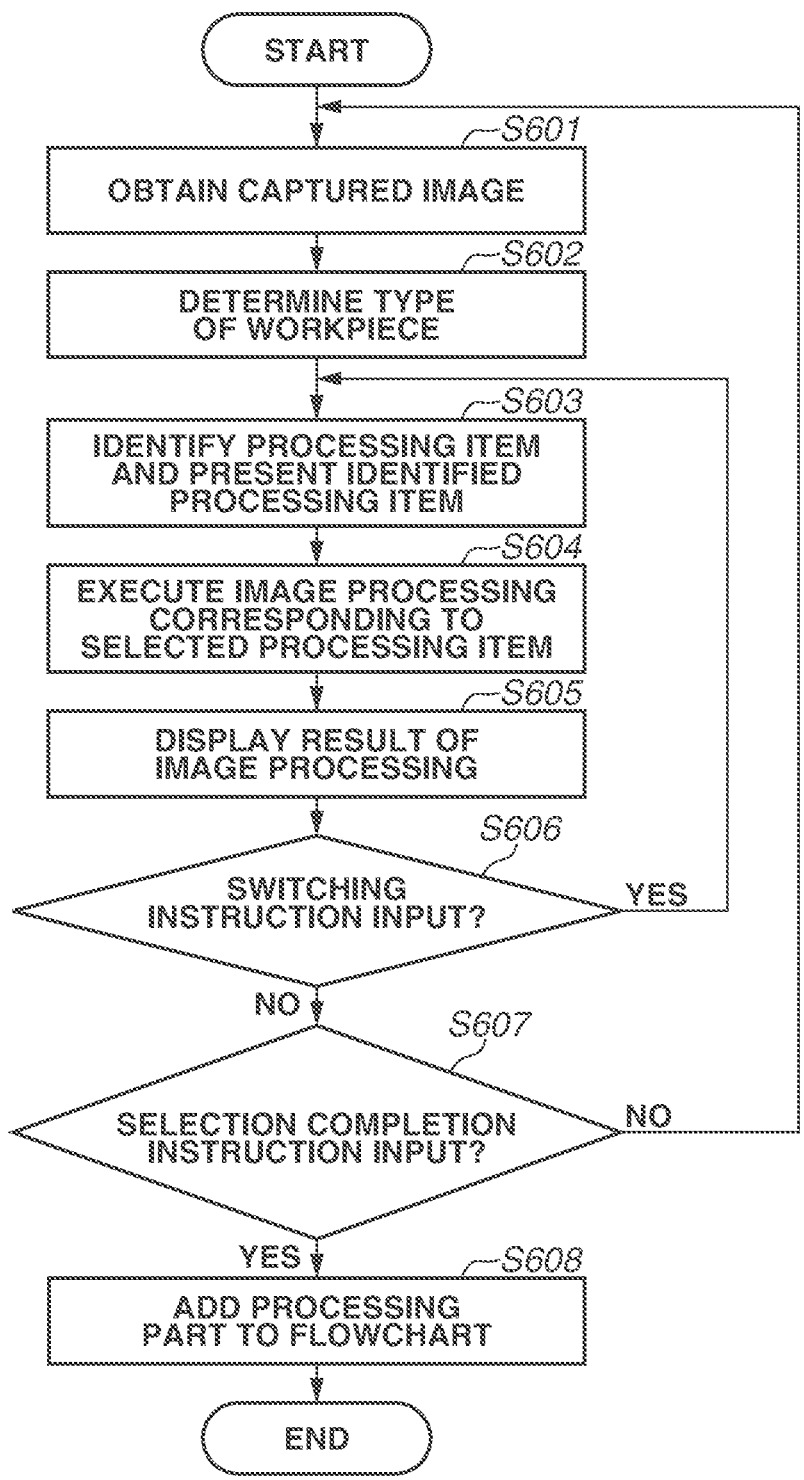
FIG. 6 is a flowchart illustrating an example of a processing procedure for supporting creation of a flowchart.

FIG. 6 is a flowchart illustrating the support processing executed by the computing unit 202. The computing unit 202 reads out the support program 214 stored in the storage unit 210 and executes the read-out support program 214, so that each step of the processing in FIG. 6 is implemented.

In step S601, the computing unit 202 obtains a captured image of a workpiece. The captured image obtained in step S601 is an image captured by capturing the workpiece 108 placed on the work base 107 illustrated in FIG. 1 from above position. The captured image obtained in step S601 may be an image captured in response to a press of a capturing instruction button (not illustrated) by the user, or may be a live view image.

In step S602, the computing unit 202 performs processing for determining (recognizing) the type of the workpiece in the captured image. Specifically, for example, the computing unit 202 separates the workpiece and the background based on background difference or threshold extraction processing, and determines the type of workpiece using image characteristics such as shape, color, and shading distribution, for the extracted workpiece. The type of workpiece may be determined by prediction from a learning model learned in advance using, for example, a neural network. Information indicating the type of workpiece recognized by the computing unit 202 is displayed in the display region 503 of the support screen 501.

In step S603, the computing unit 202 identifies one or more processing units (processing items) corresponding to the type of workpiece recognized in step S602. FIG. 7 is a diagram illustrating correlation information indicating the relationship between the type of workpiece and the corresponding processing unit.

In FIG. 7, an identification (ID) is an ID number assigned to each type of workpiece. Examples of the type of workpiece include "box", "circular ring", "one-dimensional/two-dimensional (1D/2D) code", and "character". In FIG. 7, "candidate processing" is a processing unit (processing item) corresponding to each type of workpiece.

The content of the corresponding candidate processing varies depending on the type of workpiece, as illustrated in FIG. 7. For example, in a case where the type of workpiece is "box", the position measurement processing, the phase measurement processing, flaw detection processing, and area measurement processing are each set in advance as the candidate processing. In a case where the type of workpiece is "circular ring", the position measurement processing, outer diameter measurement processing, inner diameter measurement processing, and counting processing are each set in advance as the candidate processing.

For a plurality of processing items each set as "candidate processing", priority is set in advance. For example, in a case where the workpiece is recognized as "box" as a result of object recognition, high priority is set for each of position measurement and phase measurement because enabling handling by the robot is considered most important. In a case where the workpiece is recognized as "1D/2D code" or "character", high priority is set for data reading processing to enable reading of a character string or numerical data. A table illustrated in FIG. 7 is stored in advance in the storage region 212 of the storage unit 210.

The correspondence between the type of workpiece and the processing item in the candidate processing as well as the priority of the processing item in the candidate processing in the table illustrated in FIG. 7 may be learned and updated to raise the priority of the processing item more frequently selected, while the support processing is repeated. The table may be shared by a plurality of image processing apparatuses via a network and the information may be updated. If the table in which the type of workpiece and the candidate processing (and the priority) are associated with each other is updated by learning or sharing via the network, the priority of the processing item frequently used is raised. Therefore, a processing item having high priority can be more practically recommended.

In step S603, the result of obtaining the one or more processing units (processing items) corresponding to the type of workpiece recognized by the computing unit 202 in step S602 is displayed in the processing item region 504 of the support screen 501. In the processing item region 504, the processing item having high priority is displayed at a high position.

A checkbox is also displayed for each of the processing items in the processing item region 504 of the support screen 501. The user selects a processing item to preview the processing result of the processing item, using the checkbox. For example, the position measurement processing and the phase measurement processing are selected. The processing item indicating the processing result can also be each of all the one or more processing units (processing items) corresponding to the type of workpiece recognized in step S602.

In step S604, the computing unit 202 executes the image processing corresponding to the selected processing item, for the workpiece included in the captured image.

In step S605, the computing unit 202 displays a result of the image processing executed in step S604, in the display region 502.

As described above, in the case where the position measurement processing and the phase measurement processing are selected, the result of the phase measurement processing and the result of the position measurement processing are each displayed in the display region 502.

In step S606, the computing unit 202 determines whether the button 505 is selected by operating the input device of the client terminal 105 by the user. In other words, the computing unit 202 determines whether the user has requested to switch the display of the processing item region 504 so that other processing item can be selected.

If the computing unit 202 determines that the button 505 is selected (YES in step S606), the computing unit 202 switches the display of the processing item region 504 such that a plurality of processing items including at least one processing item different from the processing items currently displayed in the processing item region 504 is displayed in the processing item region 504. The processing returns to step S603. If the computing unit 202 determines that the button 505 is not selected (NO in step S606), the processing proceeds to step S607.

In step S607, the computing unit 202 determines whether the selection of the processing item by the user is completed. Specifically, the computing unit 202 determines whether the button 507 is selected by operating the input device of the client terminal 105 by the user. When the button 507 is selected by the user, the selected processing item is stored into the storage unit 210 as a selected processing item. For example, the button 507 is pressed in a state where the processing item corresponding to the position measurement processing and the processing item corresponding to the phase measurement processing are selected. The computing unit 202 causes the display of the display unit of the client terminal 105 to transition from the support screen 501 to the editing screen illustrated in FIG. 4. If the computing unit 202 determines that the selection of the processing item by the user is not completed (NO in step S607), the processing returns to step S601.

If the computing unit 202 determines that the selection of the processing item by the user is completed (YES in step S607), the processing proceeds to step S608. In step S608, the computing unit 202 adds the processing item selected in step S607 as a processing part to a flowchart being created in the editing screen.

Figure 8:
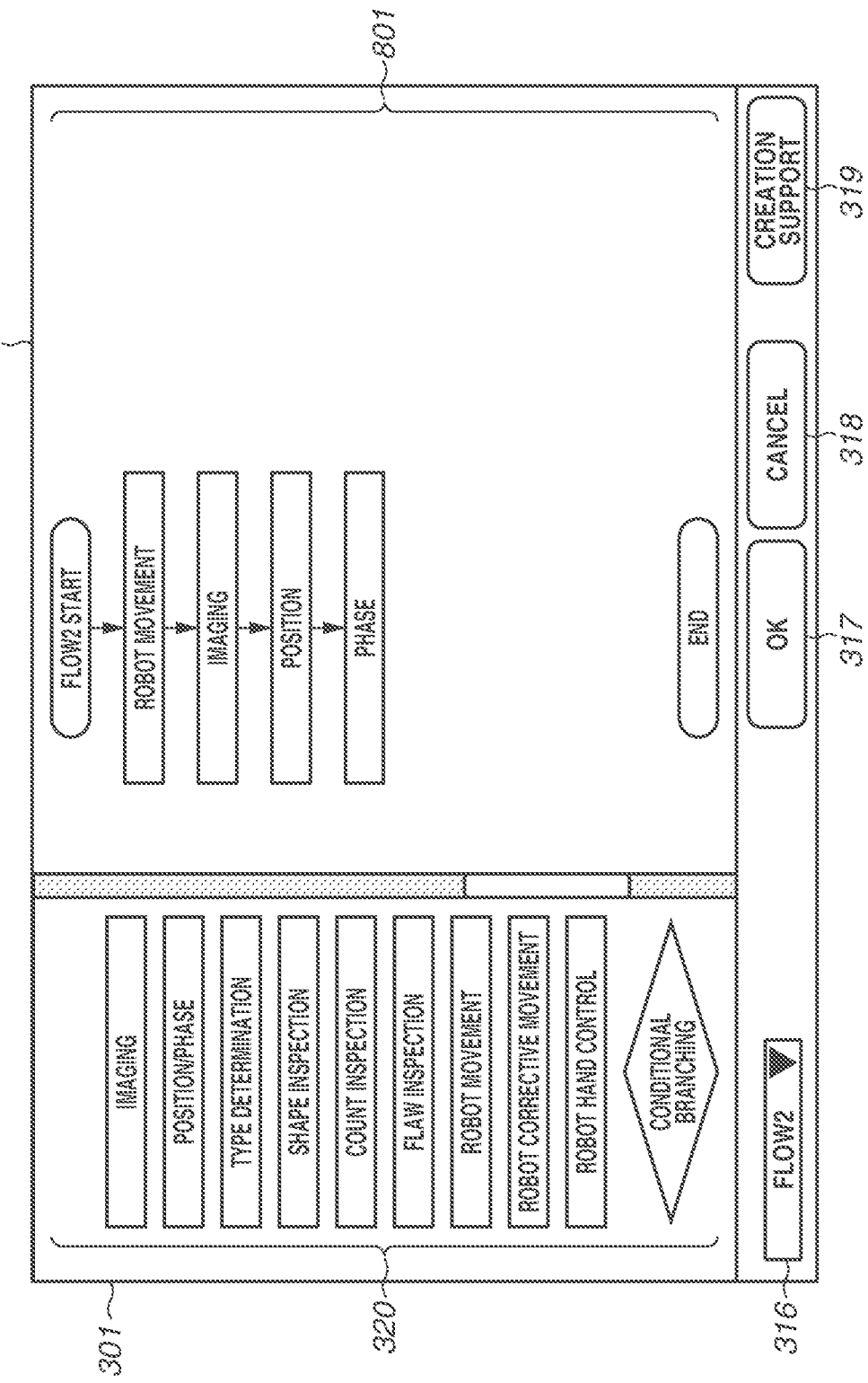
FIG. 8 is a diagram illustrating an example of a flowchart creation support screen.

FIG. 8 is a diagram illustrating an example of a screen displayed after the processing in FIG. 6. As illustrated in FIG. 8, the position measurement part and the phase measurement part are added to a flowchart 801. In the flowchart region 302, editing, such as changing or deletion, of the added position measurement part and the added phase measurement part can be performed.

Subsequently, the user adds the corrective movement part to the flowchart 801, by selecting the corrective movement part in the list 320, dragging the selected corrective movement part, and dropping the dragged corrective movement part into the flowchart region 302. Similarly, parts such as the movement part and the hand control part are selected from the list 320, and the selected processing parts are sequentially added to the flowchart 801. In a case where the workpiece is grasped, a case where the workpiece is lifted, a case where the workpiece is moved to the placement base, and a case where the workpiece is placed, detailed parameters, such as coordinate information of a movement destination and the height of the robot, are also similarly stored in advance in the storage region 212 of the storage unit 210. The user can thereby set control such as grasp of the workpiece or movement to the placement base by the robot, only by selecting the processing part.

Since the type of workpiece is recognized, there may be a case where it is desirable to change the detailed setting of the processing part. In a case where targets such as a position, a phase, and an area are to be measured, in general, a captured image having a high shade ratio and a large change amount of a color component between a workpiece and a background can be input to reliably separate the workpiece and the background. In a case where a flaw or dirt is to be detected, a captured image in which a workpiece is widely distributed within a dynamic range can be input, because, in general, color or shade change information is often important.

As described above, when the user double-clicks a processing part by operating the input device of the client terminal 105 to change the detailed settings of this processing part, the current screen transitions to a setting screen for setting the detailed processing of this processing part. In the setting screen, an adjustment can be made using capturing parameters to increase contrast, in a case where targets such as a position, a phase, and an area are to be measured. Further, in a case where a flaw or dirt is to be detected, settings such as an exposure value, a signal amplification factor, and a white balance can be changed.

As described above, according to the present embodiment, the type of workpiece is recognized from the captured image of the workpiece, and the processing item associated with the workpiece is notified. Further, the processing result of the processing item is also notified. This enables the user to select the processing item to be added to the flowchart, based on the notified processing item and the notified processing result. Since the recommended processing item is notified, the user can omit work for combining various processing items or confirming the combined processing items beforehand.

In the present embodiment, the recommended processing item is notified in association with the type of workpiece, and the processing part related to the image processing is added, in the support screen. The processing item may be added to the flowchart in combination with the control of the robot such as the movement of the robot. For example, in a case where the type of workpiece is determined to be box as a result of object recognition, a robot corrective movement part, a robot movement part, and a robot hand control part may also be added to the flowchart as processing in a subsequent stage. In this way, the processing parts closely related to the robot control are added to the flowchart when the support screen is displayed, so that the user can further omit work for creating the flowchart.

In the present embodiment, the captured image and the result of the image processing are displayed in the display region 502 of the support screen. The display region 502 may be divided into a plurality of regions and a plurality of captured images and processing results of the captured images may be simultaneously displayed in the respective regions.

Figure 9:
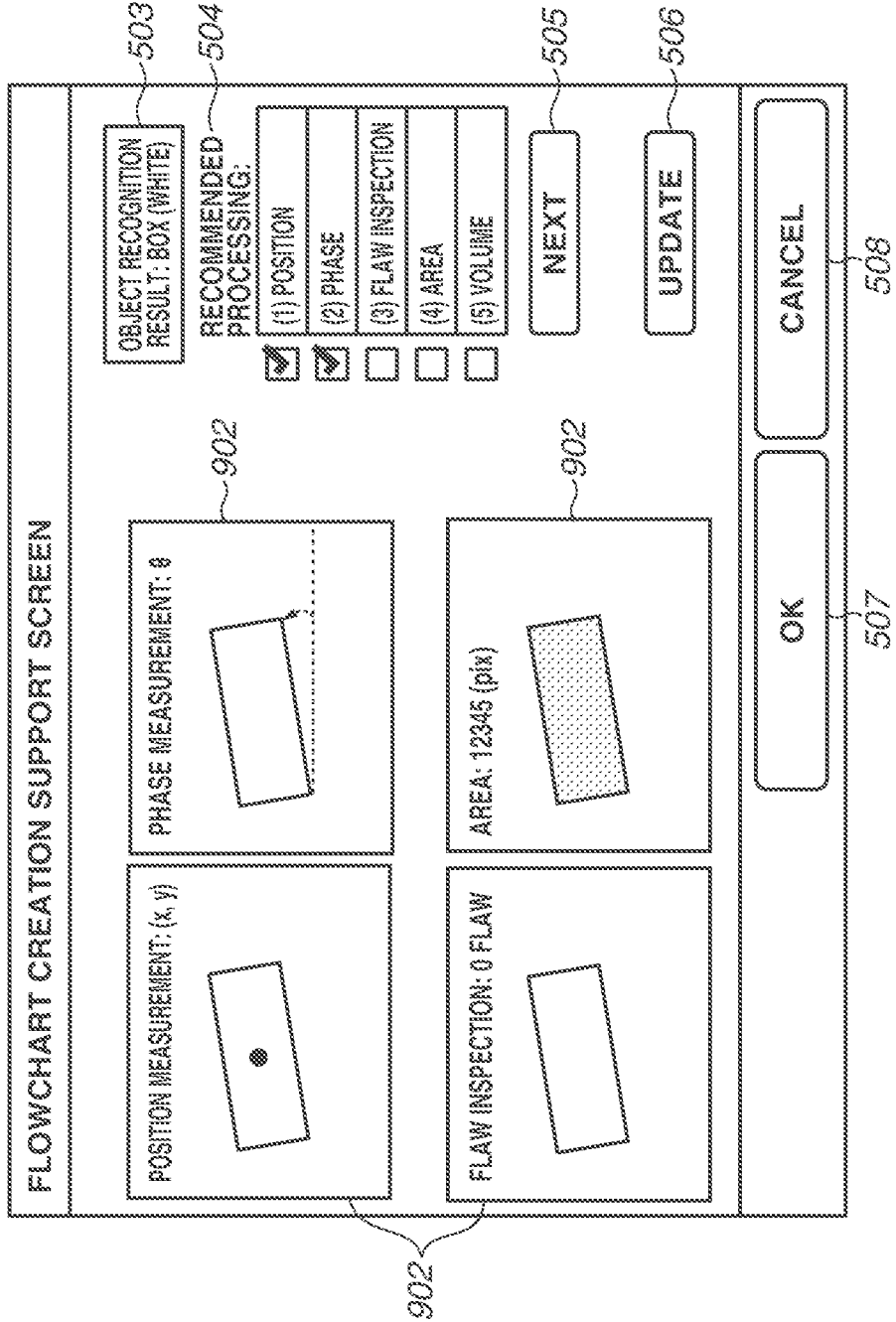
FIG. 9 is a diagram illustrating another example of a flowchart creation support screen.

FIG. 9 is a schematic diagram illustrating a modification of the support screen. A support screen 901 illustrated in FIG. 9 includes a plurality of display regions 902. Each of the display regions 902 corresponds to at least one processing item, and a result of image processing corresponding to each processing item is displayed. In FIG. 9, the result of the image processing is displayed for each of four processing items. The user can select a processing item to be added as a processing part, while confirming the result of each image processing, and comparing these results.

Second Exemplary Embodiment

The first embodiment is described on the premise that only one workpiece is present in the captured image to be subjected to the object recognition processing. In the present embodiment, an example in which two or more workpieces are included in a captured image and the workpieces are of different types will be described. In the present embodiment, in a case where two or more workpieces are recognized, a flowchart creation support screen for each of the workpieces is activated. Only a point different from the first embodiment will be described below.

Figure 10:
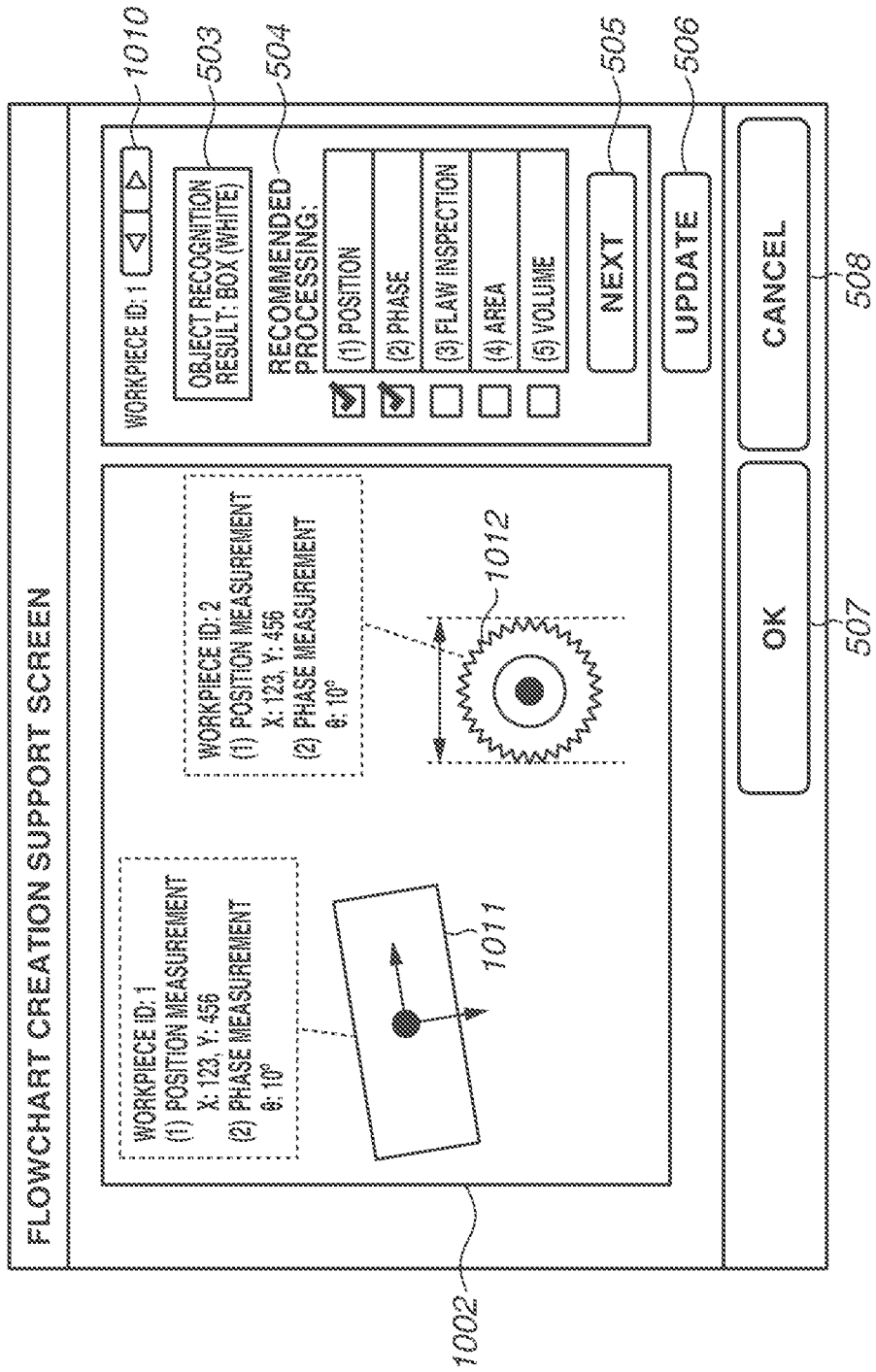
FIG. 10 is a diagram illustrating an example of a flowchart creation support screen including two types of workpiece.

FIG. 10 is a diagram illustrating an example of a support screen 1001 in a case where a plurality of workpieces is recognized. When a plurality of workpieces is recognized as illustrated in FIG. 10, each of the workpieces is displayed in a display region 1002, and each of the workpieces is assigned an identifier (hereinafter referred to as "workpiece ID"). In the example illustrated in FIG. 10, a box 1011 is assigned a workpiece ID "1", and a circular-ring workpiece 1012 is assigned a workpiece ID "2".

When object recognition and measurement are performed for each of the workpieces, a result of image processing is displayed in the display region 1002 for each of the workpieces. The result of analyzing the type of workpiece displayed in a display region 503 and a processing item region

504 are displayed only for the selected workpiece. The workpiece ID can be changed with a switching button 1010.

A procedure of creating a flowchart for robot control is basically similar to that illustrated in FIG. 6. However, in a case where the flowchart for robot control is to be created for a workpiece having a different workpiece ID, step S601 to step S604 may be omitted. In other words, according to the present embodiment, a part of processing in the procedure for creating a flowchart can be omitted when a plurality of types of workpiece is recognized as objects in one captured image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-155980, filed Aug. 28, 2019, which is hereby incorporated by reference herein in its entirety.

What is claimed is:

1. An electronic device for setting a processing procedure for controlling an apparatus, the electronic device comprising:
    at least one processor configured to cause the electronic device to perform operations of:
        obtaining a captured image;
        determining a type of an object included in the captured image by using an image recognition algorithm which uses image characteristics;
        identifying one or more processing items corresponding to the determined type of the object among a plurality of processing items;
        displaying the identified one or more processing items on a screen;
        selecting at least one of the one or more displayed processing items in response to a user instruction; and
        setting the processing procedure by adding the selected processing item to a flowchart in response to a user instruction.

2. The electronic device according to claim 1, further comprising a storage unit configured to store correlation information indicating correspondence between a type of an object and a processing item into a storage medium,
    wherein the processing item corresponding to the type of the object included in the captured image is identified based on the correlation information.

3. The electronic device according to claim 2, wherein the correlation information further includes information indicating priority of the processing item corresponding to the type of the object.

4. The electronic device according to claim 1, wherein each of the plurality of processing items includes at least one of image processing for measuring a position of the object included in the captured image, image processing for measuring a size of the object, and image processing for analyzing information indicated in the object.

5. The electronic device according to claim 1, wherein the apparatus is an industrial apparatus configured to move the object included in the captured image.

6. The electronic device according to claim 1, wherein the at least one processor is configured to cause the electronic device to perform further operations of:
    identifying processing item for each of a plurality of objects in a case where the plurality of objects is included in the captured image; and
    displaying the processing item and a result of applying the image processing to a corresponding object.

7. The electronic device according to claim 1, wherein the at least one processor is configured to cause the electronic device to perform further operations of: displaying a result of applying image processing corresponding to the selected processing item to the object included in the captured image.

8. The electronic device according to claim 1, the one or more processing items corresponding to the determined type of the object are displayed in order of priority on the screen.

9. A method for setting a processing procedure for controlling an apparatus, the method comprising:
    obtaining a captured image;
    determining a type of an object included in the captured image by using an image recognition algorithm which uses image characteristics;
    identifying one or more processing items corresponding to the determined type of the object among a plurality of processing items;
    displaying the identified one or more processing items on a screen;
    selecting at least one of the one or more displayed processing items in response to a user instruction; and
    setting the processing procedure by adding the selected processing item to a flowchart in response to a user instruction.

10. The method according to claim 9, the method further comprising storing correlation information indicating correspondence between a type of an object and a processing item into a storage medium,
    wherein the processing item corresponding to the type of the object included in the captured image is identified based on the correlation information.

11. The method according to claim 10, wherein the correlation information further includes information indicating priority of the processing item corresponding to the type of the object.

12. The method according to claim 9, wherein each of the plurality of processing items includes at least one of image processing for measuring a position of the object included in the captured image, image processing for measuring a size of the object, and image processing for analyzing information indicated in the object.

13. The method according to claim 9, wherein the apparatus is an industrial apparatus configured to move the object included in the captured image.

14. The method according to claim 9, the method further comprising:

identifying processing item for each of a plurality of objects in a case where the plurality of objects is included in the captured image; and displaying the processing item and a result of applying the image processing to a corresponding object.

15. A non-transitory computer-readable storage medium storing a program for causing a computer to execute a method for setting a processing procedure for controlling an apparatus, the method comprising:

obtaining a captured image;

determining a type of an object included in the captured image by using an image recognition algorithm which uses image characteristics;

identifying one or more processing items corresponding to the determined type of the object among a plurality of processing items;

displaying the identified one or more processing items on a screen;

selecting at least one of the one or more displayed processing items in response to a user instruction; and setting the processing procedure by adding the selected processing item to a flowchart in response to a user instruction.

\* \* \* \* \*